(12) United States Patent
Liu

(10) Patent No.: US 10,670,143 B2
(45) Date of Patent: Jun. 2, 2020

(54) MOTOR

(71) Applicant: Gang Liu, Henan (CN)

(72) Inventor: Gang Liu, Henan (CN)

(73) Assignee: Gang Liu, Zhengzhou (CN)

( * ) Notice: Subject to any disclaimer, the term of this patent is extended or adjusted under 35 U.S.C. 154(b) by 152 days.

(21) Appl. No.: 15/939,342

(22) Filed: Mar. 29, 2018

(65) Prior Publication Data

US 2018/0216732 A1    Aug. 2, 2018

Related U.S. Application Data

(63) Continuation of application No. PCT/CN2016/100694, filed on Sep. 28, 2016.

(30) Foreign Application Priority Data

Sep. 29, 2015 (CN) .......................... 2015 1 0626578
Sep. 29, 2015 (CN) ...................... 2015 2 0756749 U

(51) Int. Cl.
*F16H 1/32*     (2006.01)
*F16H 61/662*   (2006.01)
(Continued)

(52) U.S. Cl.
CPC ......... *F16H 61/66254* (2013.01); *F16H 1/32* (2013.01); *F16H 61/143* (2013.01);
(Continued)

(58) Field of Classification Search
CPC .... F16H 61/66254; F16H 61/143; F16H 1/32; F16H 57/02; H02K 1/278; H02K 1/2773;
(Continued)

(56) References Cited

U.S. PATENT DOCUMENTS

2005/0236198 A1* 10/2005 Jenkins ................ B60K 7/0007
                                                           180/65.51
2010/0093484 A1*  4/2010 Huang ..................... F16H 1/46
                                                              475/330
(Continued)

FOREIGN PATENT DOCUMENTS

CN        2602540       2/2004
CN      102226463      10/2011
(Continued)

*Primary Examiner* — Justin Holmes
(74) *Attorney, Agent, or Firm* — Wayne & Ken, LLC; Tony Hom

(57) ABSTRACT

A motor with a variable-speed torque converter is disclosed. A rotor of the motor has a common permanent magnet structure. Permanent magnets are disposed on the rotor. The variable-speed torque converter includes a wheel disc, a wheel ring, a roller, a transmission gear II, a transmission gear III, a round wheel, an annular gear, a driving gear, turning discs, a transmission shaft, and an output shaft. The driving gear fixedly connected to the transmission shaft of the motor drives the transmission gear. The transmission gear is in contact with the annular gear. The transmission gear rotates around the driving gear to drive the wheel disc to rotate together. The wheel disc is fixedly connected to the output shaft to drive a driving wheel to rotate. Therefore, a working capability of the motor is enhanced. The converter can be applied to an electromotor, a generator, or any other power device.

9 Claims, 9 Drawing Sheets

(51) Int. Cl.
*H02K 7/116* (2006.01)
*H02K 1/27* (2006.01)
*F16H 61/14* (2006.01)
*H02K 21/16* (2006.01)
*F16H 57/02* (2012.01)

(52) U.S. Cl.
CPC ............. *H02K 1/276* (2013.01); *H02K 1/278* (2013.01); *H02K 1/2773* (2013.01); *H02K 7/116* (2013.01); *H02K 21/16* (2013.01); *F16H 57/02* (2013.01); *H02K 1/274* (2013.01)

(58) Field of Classification Search
CPC ........ H02K 1/276; H02K 21/16; H02K 7/116; H02K 1/274
See application file for complete search history.

(56) References Cited

U.S. PATENT DOCUMENTS

| | | | |
|---|---|---|---|
| 2013/0274050 A1* | 10/2013 | Kalmbach | F16H 3/44 475/150 |
| 2016/0252171 A1* | 9/2016 | Hederstad | B60K 17/165 475/204 |
| 2016/0333965 A1* | 11/2016 | Shen | F16H 37/0833 |
| 2017/0197503 A1* | 7/2017 | Yukishima | B60K 7/00 |
| 2018/0320735 A1* | 11/2018 | Blomeke | F16H 1/32 |

FOREIGN PATENT DOCUMENTS

| | | | |
|---|---|---|---|
| CN | 102263445 | 11/2011 | |
| CN | 202334139 | 7/2012 | |
| WO | WO-2008068207 A1 * | 6/2008 | ......... B60G 21/0555 |
| WO | 2015029345 | 3/2015 | |

* cited by examiner

MOTOR

TECHNICAL FIELD

The present invention relates to the electromechanical field, and in particular, to a motor.

BACKGROUND

It is well known that, currently, most of speed governing systems of motors are deceleration systems. There are great mechanical losses during transmission in the speed governing systems. In addition, structures of rotors in the motors, and in particular, rotors of permanent magnet structures, are not ideal. Therefore, the rotor structures and the speed governing systems in the motors need to be improved.

SUMMARY

The present invention discloses a motor, including an end cover a, an end cover b, and a transmission shaft, where the transmission shaft is connected in a sliding manner to the end cover a and the end cover b by using bearings, a rotor of a common permanent magnet structure is fixedly connected to the transmission shaft, the rotor has a permeable frame, the permeable frame is in a circular shape on the whole, holes are distributed on the permeable frame evenly and symmetrically, permanent magnets are disposed in the holes so that at least two magnetic poles are formed on the rotor, a permanent magnet between two adjacent magnetic poles is for common use, a magnetic bridge is formed between the holes in which the permanent magnets are disposed, and space occupied by the magnetic bridge is mostly occupied by the permanent magnets; and further including an adjustable-speed variable-torque device, where an input portion of the adjustable-speed variable-torque device is set to deceleration, a portion thereafter is set to torque increase and acceleration, and the adjustable-speed variable-torque device includes a housing, an end cover c, an end cover d, a driving gear, a gear II, a gear III, a round wheel, a wheel axle, cylindrical pins, turning discs, an annular gear, a roller, a wheel ring, a wheel disc, a central gear, planet gears, a stationary ring, an output gear, an output shaft, bearings, and a driving wheel, where the end cover c and the end cover d are fixedly disposed at two ends of the housing, one of the end cover c and the end cover d and one of the end covers of the motor form an integrated structure, the driving gear in the housing is fixedly disposed on the transmission shaft, the driving gear is in contact with at least one set of transmission gears, one set of transmission gears includes a gear II and a gear III that are combined with a round wheel into an integrated structure and fixedly connected to a wheel axle jointly, the driving gear is in contact with the gear II, the gear III is contact with the annular gear, the annular gear is fixedly connected to the housing, at least one round wheel is connected in a sliding manner to a roller, the wheel axle is connected in a sliding manner to two turning discs by using bearings, there are at least two cylindrical pins between the two turning discs for supporting and fixedly connecting the two turning discs to form an integrated structure, the two turning discs are connected in a sliding manner to the transmission shaft by using bearings, at least one roller is fixedly connected to a wheel axle, at least one wheel axle is connected in a sliding manner to the wheel disc and the wheel ring by using bearings, there are at least two cylindrical pins between the wheel disc and the wheel ring for supporting and fixedly connecting the wheel disc and the wheel ring to form an integrated structure, the wheel disc is connected in a sliding manner to the output shaft by using a bearing, the central gear fixedly connected to the wheel disc is in contact with at least one planet gear, there are two planet gears, the planet gears are combined into an integrated structure and connected in a sliding manner to a wheel axle by using bearings, at least another planet gear is in contact with the output gear, one end of the wheel axle is fixedly connected to the stationary ring, the other end of the wheel axle is fixedly connected to an end cover of the motor, the planet gear is in contact with the output gear, the output gear is fixedly connected to the output shaft, one end of the output shaft is connected in a sliding manner to an inner hole of the transmission shaft, and the other end of the output shaft, after passing through an end cover, is fixedly connected to the driving wheel by using a bearing.

Preferably, the motor is an electromotor, the end cover a and the end cover b are located at two ends of a shell of the electromotor, the end cover d and the end cover b form an integrated structure, a stator, the rotor, and the adjustable-speed variable-torque device are located in the electromotor, and the stator is fixed on the adjustable-speed variable-torque device; the rotor is cylinder-shaped, a cylinder bottom is in a circular shape, the cylinder bottom is fixedly connected to the transmission shaft, a cylinder wall is fixedly connected to the cylinder bottom, and the cylinder wall has a permeable frame made of a permeable material sheet; the transmission shaft and the output shaft are connected in a sliding manner to the end cover a and the end cover b by using bearings, and the rotor is fixedly connected to the transmission shaft; in a radial direction, the rotor internally corresponds to the stator; and in an axial direction, one end of the transmission shaft is connected in a sliding manner to the end cover a by using a bearing and then fixedly connected to a fan, there is a hole in the other end, the driving gear is fixedly connected to the other end, and the output shaft is connected in a sliding manner to the hole.

Preferably, the motor is an electromotor, a stator, the rotor, and the adjustable-speed variable-torque device are located in the electromotor, the stator is fixed on a shell of the electromotor, and the rotor is fixed on the adjustable-speed variable-torque device; the end cover a and the end cover b are fixed at two ends of the shell of the electromotor, the transmission shaft and the output shaft are connected in a sliding manner to the end cover a and the end cover b by using bearings, the rotor is fixedly connected to the transmission shaft, the rotor is integrated with the housing of the adjustable-speed variable-torque device, and the transmission shaft is fixedly connected to the end cover c and connected in a sliding manner to the output shaft; in a radial direction, the rotor externally corresponds to the stator; in an axial direction, one end of the output shaft, after passing through the end cover a, is fixedly connected to a fan by using a bearing, and the other end of the output shaft, after passing through the end cover b, is fixedly connected to the driving wheel by using a bearing; the permeable frame in the rotor is cylinder-shaped and fixed on the housing of the adjustable-speed variable-torque device and locked by the end cover c and the end cover d; and the adjustable-speed variable-torque device further includes a wheel carrier and a stationary pipe, the end cover d is connected in a sliding manner to the stationary pipe by using a bearing, the transmission shaft is pipe-shaped, the transmission shaft is internally connected in a sliding manner to the output shaft by using a bearing, the transmission shaft is externally fixedly connected to the driving gear, the wheel carrier is cylinder-shaped, a cylinder wall is fixedly connected to the annular gear, a cylinder bottom is a circular disc and is fixedly connected to the stationary pipe, the stationary pipe is fixedly connected to the end cover b, the stationary pipe is internally connected in a sliding manner to the output shaft by using a bearing, one end of a wheel axle is fixedly connected to the stationary ring, and the other end of the wheel axle is fixedly connected to the circular disc at the cylinder bottom of the wheel carrier.

Preferably, the motor is an electromotor, the adjustable-speed variable-torque device is disposed at one end of the electromotor, and a stator and the rotor are disposed in the electromotor.

Preferably, the motor is a generator, the end cover a and the end cover b are located at two ends of a shell of the generator, the end cover d and the end cover b form an integrated structure, a stator, the rotor, and the adjustable-speed variable-torque device are located in the generator, and the stator is fixed on the adjustable-speed variable-torque device; the rotor is cylinder-shaped, a cylinder bottom is in a circular shape, the cylinder bottom is fixedly connected to the output shaft, a cylinder wall is fixedly connected to the cylinder bottom, and the cylinder wall has a permeable frame made of a permeable material sheet; the transmission shaft and the output shaft are connected in a sliding manner to the end cover a and the end cover b by using bearings, and the rotor is fixedly connected to the output shaft; in a radial direction, the rotor internally corresponds to the stator; and in an axial direction, one end of the output shaft is connected in a sliding manner to the end cover a by using a bearing and then fixedly connected to a fan, the other end of the output shaft is connected in a sliding manner to the inner hole of the transmission shaft, the driving gear is fixedly connected to the transmission shaft, and the transmission shaft is connected in a sliding manner to the two turning discs.

Preferably, the motor is a generator, a stator, the rotor, and the adjustable-speed variable-torque device are located in the generator, the stator is fixed on a shell of the generator, and the rotor is fixed on the adjustable-speed variable-torque device; the end cover a and the end cover b are fixed at two ends of the shell of the generator, the transmission shaft and the output shaft are connected in a sliding manner to the end cover a and the end cover b by using bearings, the rotor is fixedly connected to the output shaft, and the rotor is integrated with the adjustable-speed variable-torque device; in a radial direction, the rotor externally corresponds to the stator; and in an axial direction, one end of the output shaft is connected in a sliding manner to the end cover a by using a bearing and then fixedly connected to a fan, the other end of the output shaft is fixedly connected to the output gear and then connected in a sliding manner to the inner hole of the transmission shaft, and the transmission shaft is internally connected in a sliding manner to the output shaft, externally fixedly connected to the driving gear, connected in a sliding manner to the end cover b by using a bearing, and then fixedly connected to the driving wheel.

Preferably, the adjustable-speed variable-torque device includes the turning discs, the cylindrical pins, the driving gear, gears II, gears III, round wheels, wheel axles, the annular gear, the wheel disc, rollers, a transmission shaft, and the output shaft; there are at least two cylindrical pins between the two turning discs for supporting the turning discs, at least two sets of transmission gears are mounted, each set of transmission gears includes a gear II, a gear III, and a round wheel, the gear II, the gear III, and the round wheel are fixedly connected to a same wheel axle, and bearings are mounted at two ends of the wheel axle for connecting to the two turning discs in a sliding manner; there are at least two cylindrical pins for supporting between the wheel ring and the wheel disc, at least two rollers are mounted, the rollers are fixedly connected to a wheel axle, and bearings are mounted at two ends of the wheel axle for connecting to the wheel ring and wheel disc in a sliding manner; and the driving gear is fixedly connected to the transmission shaft, and the driving gear is in contact with the gears II in the at least two sets of transmission gears.

A power device includes an engine, where the adjustable-speed variable-torque device is applied to the engine.

A human power transmission mechanism includes a bicycle, where the adjustable-speed variable-torque device is applied to the bicycle.

The motor of the present invention has a simple structure. Featuring a mature technology, the present invention can be extensively applied to an electromotor, a generator, or any other power device.

DESCRIPTION OF EMBODIMENTS

Figure 1:
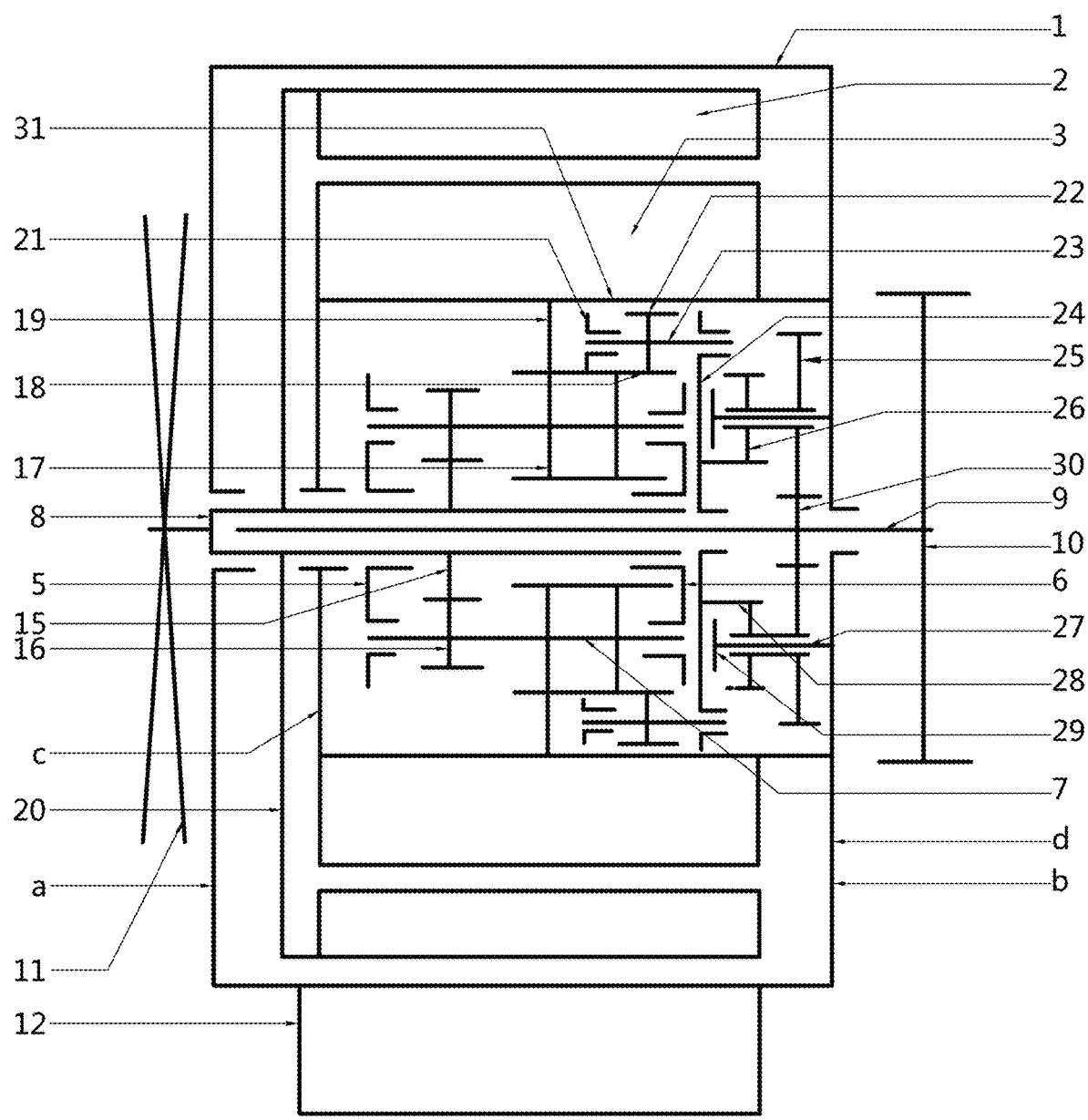
FIG. 1 is a schematic structural diagram of an electromotor combined with an adjustable-speed variable-torque device.

FIG. 1 is a schematic structural diagram of an electromotor combined with an adjustable-speed variable-torque device. As shown in FIG. 1, in an electromotor aspect, an electromotor includes a stator 3, a rotor 2 of a common permanent magnet structure, and an adjustable-speed variable-torque device. The stator 3 is fixed on the adjustable-speed variable-torque device. An end cover a and an end cover b are fixed at two ends of a shell 1 of the electromotor. A bottom of the shell 1 is fixedly connected to a base 12. A transmission shaft 8 and an output shaft 9 are connected in a sliding manner to the end cover a and the end cover b by using bearings. The rotor 2 is fixedly connected to the transmission shaft 8. The rotor 2 is cylinder-shaped. In a radial direction, the rotor 2 internally corresponds to the stator 3. In an axial direction, divided by a cylinder bottom 20 of the rotor 2, a short end of the transmission shaft 8 is connected in a sliding manner to the end cover a by using a bearing and then fixedly connected to a fan 11; and the other end of the transmission shaft 8 is long and has a hole, the output shaft 9 is connected in a sliding manner to the hole, and the other end is fixedly connected to a driving gear 15 of the adjustable-speed variable-torque device. The rotor 2 has a common permanent magnet structure. The rotor 2 is cylinder-shaped, and the cylinder bottom 20 is in a circular shape. The cylinder bottom 20 is fixedly connected to the transmission shaft 8, a cylinder wall is fixedly connected to the cylinder bottom 20, and the cylinder wall has a permeable frame made of a permeable material sheet, for example, a ferrosilicon sheet. The permeable frame is cylinder-shaped on the whole. Holes are distributed on the permeable frame evenly and symmetrically, and permanent magnets are disposed in the holes so that four magnetic poles are formed on the rotor. A permanent magnet between two adjacent magnetic poles is for common use, a magnetic bridge is formed between the holes in which the permanent magnets are disposed, and space occupied by the magnetic bridge is mostly occupied by the permanent magnets. The adjustable-speed variable-torque device is formed by combining a housing 31, an end cover c, an end cover d, the transmission shaft 8, the driving gear 15, a gear II 16, a gear III 17, a round wheel 18, a wheel axle 7, cylindrical pins, a turning disc 5, a turning disc 6, an annular gear 19, a roller 22, a wheel axle 23, cylindrical pins, a wheel ring 21, a wheel disc 24, a central gear 28, a planet gear 26, a planet gear 25, a wheel axle 27, a stationary ring 29, an output gear 30, the output shaft 9, bearings, and a driving wheel 10. The end cover c and the end cover d are fixed at two ends of the housing 31. The end cover d and the end cover b of the electromotor form an integrated structure. In the housing 31, the driving gear 15 is fixedly connected to the transmission shaft 8. The driving gear 15 is in contact with the gear II 16. The gear II 16, the gear III 17, and the round wheel 18 form an integrated structure and are fixedly connected to the wheel axle 7 jointly. The gear III 17 is in contact with the annular gear 19. The annular gear 19 is fixedly connected to the housing 31. The wheel axle 7 is connected in a sliding manner to the turning disc 5 and the turning disc 6 by using bearings. There are four cylindrical pins between the turning disc 5 and the turning disc 6 for supporting and fixedly connecting the turning discs to form an integrated structure. The turning disc 5 and the turning disc 6 are connected in a sliding manner to the transmission shaft 8 by using bearings. The round wheel 18 is connected in a sliding manner to the roller 22. The roller 22 is fixedly connected to the wheel axle 23. The wheel axle 23 is connected in a sliding manner to the wheel disc 24 and the wheel ring 21 by using bearings. There are four cylindrical pins between the wheel disc 24 and the wheel ring 21 for supporting and fixedly connecting the wheel disc 24 and the wheel ring 21 to form an integrated structure. The wheel disc 24 is connected in a sliding manner to the output shaft 9 by using a bearing. The central gear 28 fixedly connected to the wheel disc 24 is in contact with the planet gear 26. The planet gear 26 and the planet gear 25 form an integrated structure and are connected in a sliding manner to the wheel axle 27 by using bearings. One end of the wheel axle 27 is fixedly connected to the stationary ring 29, and the other end of the wheel axle 27 is fixedly connected to the end cover b of the electromotor. The planet gear 25 is in contact with the output gear 30. The output gear 30 is fixedly connected to the output shaft 9. In an axial direction, divided by the output gear 30, a long end of the output shaft 9 is connected in a sliding manner to the inner hole of the transmission shaft 8, and the other end of the output shaft 9 is connected in a sliding manner to the end cover b by using a bearing and then fixedly connected to the driving wheel 10. The rotor in the electromotor rotates. The driving gear 15 fixedly connected to the transmission shaft 8 drives the gear II 16. The gear III 17 rotates synchronously with the gear II 16 and is in contact with the annular gear 19 to drive the annular gear 19 to rotate around the driving gear 15, and the round wheel 18 rotates together. The round wheel 18 propels the roller 22 to drive the wheel disc 24 to rotate together. The central gear 28 rotates synchronously with the wheel disc 24 to drive the planet gear 26. The planet gear 25 rotates synchronously with the planet gear 26 to drive the output gear 30. The output gear 30 is fixedly connected to the output shaft 9 and drives the driving wheel 10 to rotate.

Figure 2:
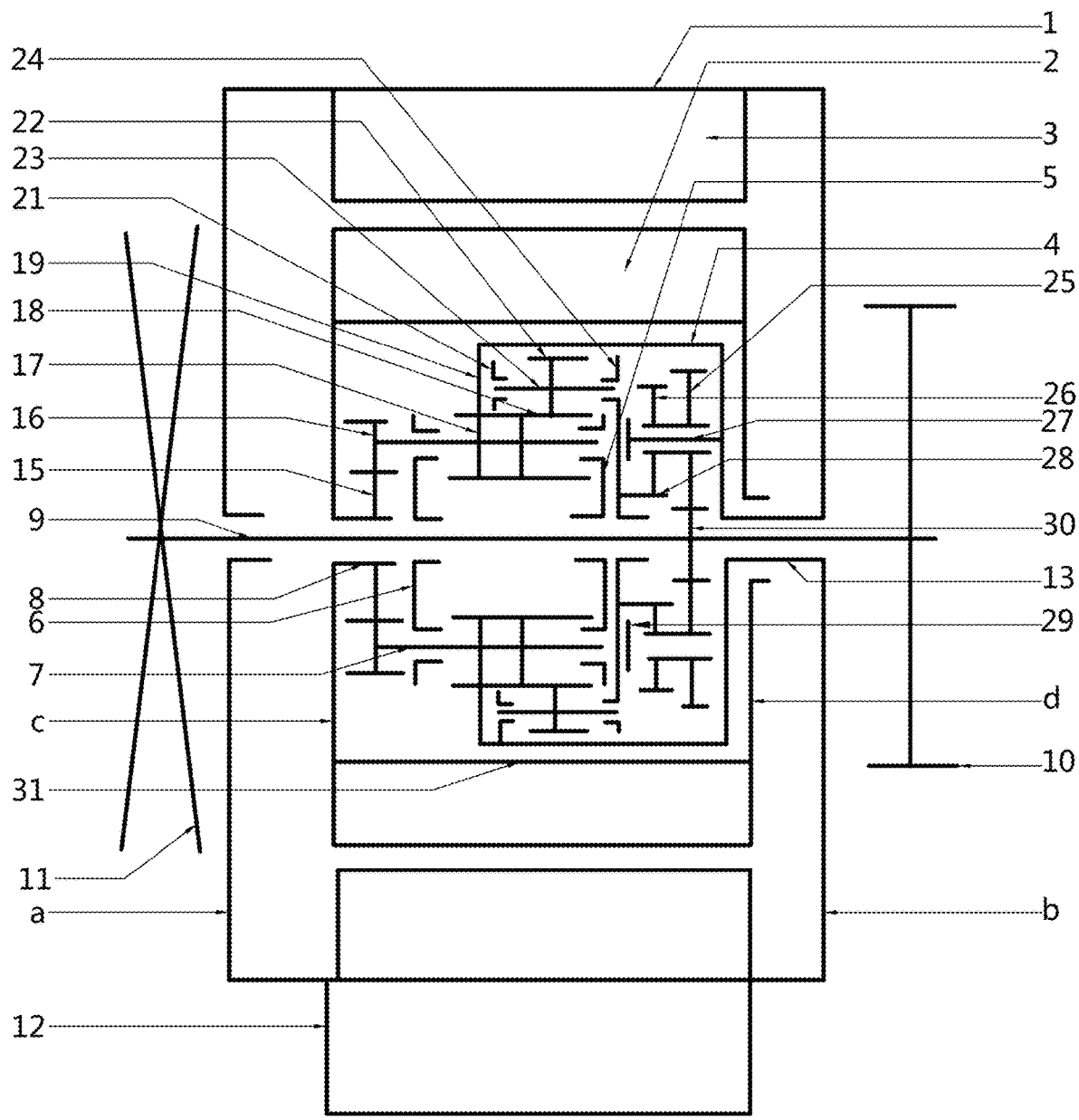
FIG. 2 is a schematic structural diagram of an electromotor combined with an adjustable-speed variable-torque device.

FIG. 2 is a schematic structural diagram of an electromotor combined with an adjustable-speed variable-torque device. As shown in FIG. 2, in an electromotor aspect, an electromotor includes a stator 3, a rotor 2 of a common permanent magnet structure, and an adjustable-speed variable-torque device. The stator 3 is fixed on a shell 1. The rotor 2 is fixed on the adjustable-speed variable-torque device. An end cover a and an end cover b are fixed at two ends of the shell 1 of the electromotor. A bottom of the shell 1 is fixedly connected to a base 12. A transmission shaft 8 and an output shaft 9 are connected in a sliding manner to the end cover a and the end cover b by using bearings. The rotor 2 is fixedly connected to the transmission shaft 8. The rotor 2 is integrated with the adjustable-speed variable-torque device and connected in a sliding manner to the output shaft 9. In a radial direction, the rotor 2 externally corresponds to the stator 3. In an axial direction, divided by a cover c, one end of the output shaft 9 is connected in a sliding manner to the end cover a by using a bearing and then fixedly connected to a fan 11, and the other end of the output shaft 9 is connected in a sliding manner to the end cover b by using a bearing and then fixedly connected to a driving wheel 10. The rotor 2 has a common permanent magnet structure. The rotor 2 is cylinder-shaped. A permeable frame of the rotor 2 is cylinder-shaped and fixed on a housing 31 of the adjustable-speed variable-torque device and locked by the end cover c and an end cover d. The permeable frame is made of a permeable material sheet, for example, a ferrosilicon sheet. Holes are distributed on the permeable frame evenly and symmetrically, and permanent magnets are disposed in the holes so that magnetic poles are formed on the rotor. A permanent magnet between two adjacent magnetic poles is for common use, a magnetic bridge is formed between the holes in which the permanent magnets are disposed, and space occupied by the magnetic bridge is mostly occupied by the permanent magnets. The adjustable-speed variable-torque device is formed by combining the housing 31, the end cover c, the end cover d, the transmission shaft 8, a driving gear 15, a gear II 16, a gear III 17, a round wheel 18, a wheel axle 7, cylindrical pins, a turning disc 5, a turning disc 6, an annular gear 19, a wheel carrier 4, a wheel ring 21, a wheel axle 23, cylindrical pins, a roller 22, a wheel disc 24, a central gear 28, a planet gear 26, a planet gear 25, a wheel axle 27, a stationary ring 29, an output gear 30, a stationary pipe 13, the output shaft 9, bearings, and the driving wheel 10. The end cover c and the end cover d are fixed at two ends of the housing 31. The end cover d is connected in a sliding manner to the stationary pipe 13 by using a bearing. The end cover c is fixedly connected to the transmission shaft 8. The transmission shaft 8 is pipe-shaped. The transmission shaft 8 is internally connected in a sliding manner to the output shaft 9 by using a bearing. The transmission shaft 8 is externally fixedly connected to the driving gear 15. The driving gear 15 is in contact with the gear II 16. The gear II 16, the gear III 17, and the round wheel 18 form an integrated structure and are fixedly connected to the wheel axle 7 jointly. The gear III 17 is in contact with the annular gear 19. The annular gear 19 is fixedly connected to the wheel carrier 4. The wheel carrier 4 is cylinder-shaped, a cylinder wall is fixedly connected to the annular gear 19, and a cylinder bottom is a circular disc and is fixedly connected to the stationary pipe 13. The stationary pipe 13 is fixedly connected to the end cover b. The stationary pipe 13 is internally connected in a sliding manner to the output shaft 9 by using a bearing. The wheel axle 7 is connected in a sliding manner to the turning disc 5 and the turning disc 6 by using bearings. There are four cylindrical pins between the turning disc 5 and the turning disc 6 for supporting and fixedly connecting the turning discs to form an integrated structure. The turning disc 5 and the turning disc 6 are connected in a sliding manner to the output shaft 9 by using bearings. The round wheel 18 is connected in a sliding manner to the roller 22. The roller 22 is fixedly connected to the wheel axle 23. The wheel axle 23 is connected in a sliding manner to the wheel disc 24 and the wheel ring 21 by using bearings. There are four cylindrical pins between the wheel disc 24 and the wheel ring 21 for supporting and fixedly connecting the wheel disc 24 and the wheel ring 21 to form an integrated structure. The wheel disc 24 is connected in a sliding manner to the output shaft 9 by using a bearing. The central gear 28 fixedly connected to the wheel disc 24 is in contact with the planet gear 26. The planet gear 26 and the planet gear 25 form an integrated structure and are connected in a sliding manner to the wheel axle 27 by using bearings. One end of the wheel axle 27 is fixedly connected to the stationary ring 29, and the other end of the wheel axle 27 is fixedly connected to the circular disc at the cylinder bottom of the wheel carrier 4. The planet gear 25 is in contact with the output gear 30. The output gear 30 is fixedly connected to the output shaft 9. The output shaft 9 is connected in a sliding manner to the stationary pipe 13 by using a bearing and then fixedly connected to the driving wheel 10. The rotor in the electromotor rotates. The driving gear 15 fixedly connected to the transmission shaft 8 drives the gear II 16. The gear III 17 rotates synchronously with the gear II 16 and is in contact with the annular gear 19 to drive the annular gear 19 to rotate around the driving gear 15, and the round wheel 18 rotates together. The round wheel 18 propels the roller 22 to drive the wheel disc 24 to rotate together. The central gear 28 rotates synchronously with the wheel disc 24 to drive the planet gear 26. The planet gear 25 rotates synchronously with the planet gear 26 to drive the output gear 30. The output gear 30 is fixedly connected to the output shaft 9 and drives the driving wheel 10 to rotate.

Figure 3:
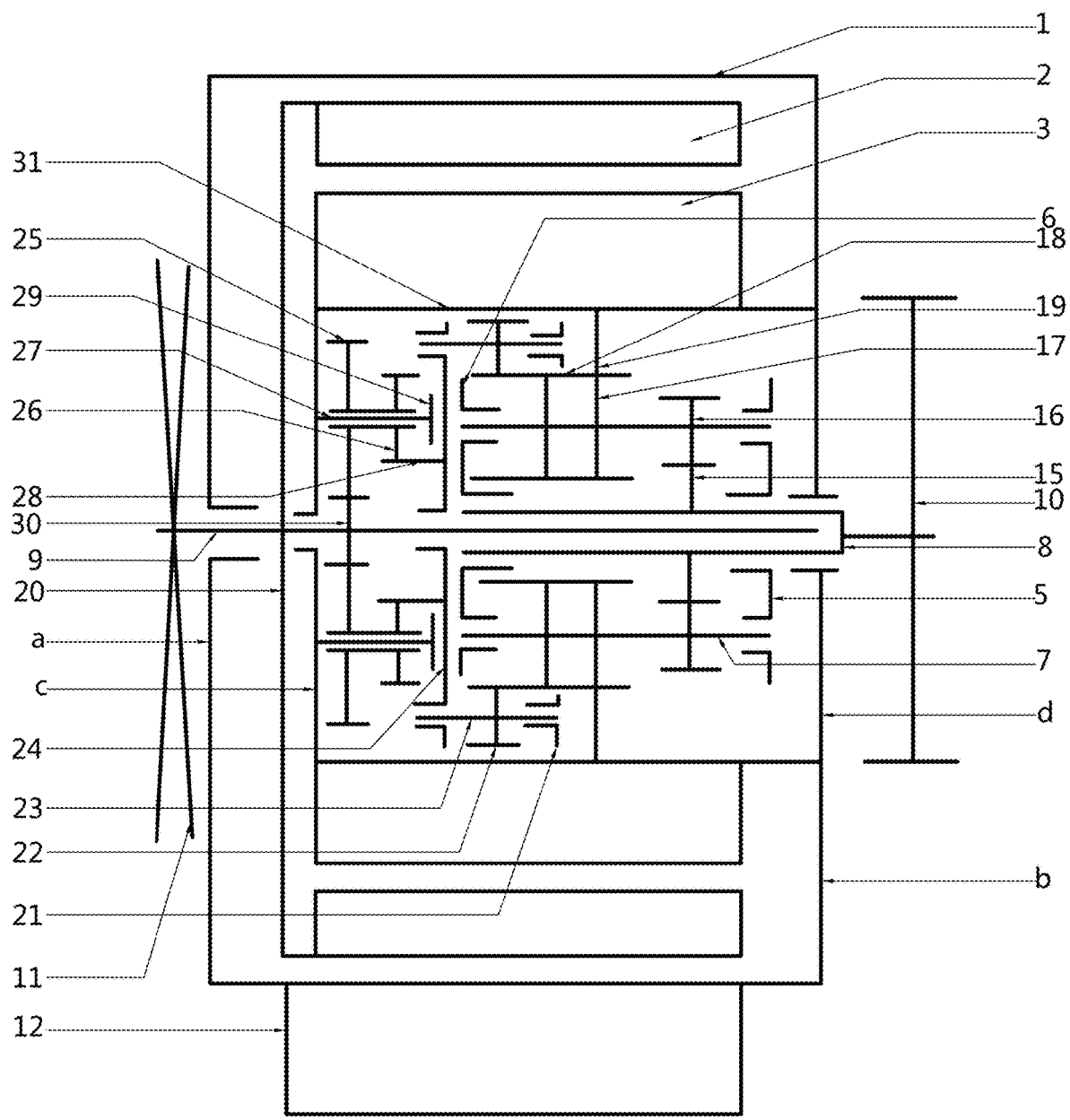
FIG. 3 is a schematic structural diagram of a generator combined with an adjustable-speed variable-torque device.

FIG. 3 is a schematic structural diagram of a generator combined with a adjustable-speed variable-torque device. As shown in FIG. 3, in a generator aspect, a generator includes a stator 3, a rotor 2 of a common permanent magnet structure, and an adjustable-speed variable-torque device. The stator 3 is fixed on the adjustable-speed variable-torque device. An end cover a and an end cover b are fixed at two ends of a shell 1 of the generator. A bottom of the shell 1 is fixedly connected to a base 12. A transmission shaft 8 and an output shaft 9 are connected in a sliding manner to the end cover a and the end cover b by using bearings. The transmission shaft 8 has a deep inner hole. The rotor 2 is fixedly connected to the output shaft 9. In a radial direction, the rotor 2 internally corresponds to the stator 3. In an axial direction, divided by a cylinder bottom 20 of the rotor 2, a short end of the output shaft 9 is connected in a sliding manner to the end cover a by using a bearing and then fixedly connected to a fan 11; and the other end of the output shaft 9 is long and is connected in a sliding manner to the inner hole of the transmission shaft 8. A driving gear 15 is fixedly connected to the transmission shaft 8. The transmission shaft 8 is connected in a sliding manner to a turning disc 5 and a turning disc 6. The rotor 2 has a common permanent magnet structure. The rotor 2 is cylinder-shaped, the cylinder bottom 20 is in a circular shape and is fixedly connected to the output shaft 9, a cylinder wall is fixedly connected to the cylinder bottom 20, and the cylinder wall has a permeable frame made of a permeable material sheet, for example, a ferrosilicon sheet. The permeable frame is cylinder-shaped on the whole. Holes are distributed on the permeable frame evenly and symmetrically, and permanent magnets are disposed in the holes so that four magnetic poles are formed on the rotor. A permanent magnet between two adjacent magnetic poles is for common use, a magnetic bridge is formed between the holes in which the permanent magnets are disposed, and space occupied by the magnetic bridge is mostly occupied by the permanent magnets. The adjustable-speed variable-torque device is formed by combining a housing 31, an end cover c, an end cover d, the transmission shaft 8, the driving gear 15, a gear II 16, a gear III 17, a round wheel 18, a wheel axle 7, cylindrical pins, the turning disc 5, the turning disc 6, an annular gear 19, a roller 22, a wheel axle 23, cylindrical pins, a wheel ring 21, a wheel disc 24, a central gear 28, a planet gear 26, a planet gear 25, a wheel axle 27, a stationary ring 29, an output gear 30, the output shaft 9, bearings, and a driving wheel 10. The end cover c and the end cover d are fixed at two ends of the housing 31. The end cover d and the end cover b of the generator form an integrated structure. In the housing 31, the transmission shaft 8 is fixedly connected to the driving wheel 10 and then connected in a sliding manner to the end cover b by using a bearing. The driving gear 15 is fixedly connected to the transmission shaft 8. The driving gear 15 is in contact with the gear II 16. The gear II 16, the gear III 17, and the round wheel 18 form an integrated structure and are fixedly connected to the wheel axle 7 jointly. The gear III 17 is in contact with the annular gear 19. The annular gear 19 is fixedly connected to the housing 31. The round wheel 18 is connected in a sliding manner to the roller 22. The wheel axle 7 is connected in a sliding manner to the turning disc 5 and the turning disc 6 by using bearings. There are four cylindrical pins between the turning disc 5 and the turning disc 6 for supporting and fixedly connecting the turning discs to form an integrated structure. The turning disc 5 and the turning disc 6 are connected in a sliding manner to the transmission shaft 8 by using bearings. The roller 22 is fixedly connected to the wheel axle 23. The wheel axle 23 is connected in a sliding manner to the wheel disc 24 and the wheel ring 21 by using bearings. There are four cylindrical pins between the wheel disc 24 and the wheel ring 21 for supporting and fixedly connecting the wheel disc 24 and the wheel ring 21 to form an integrated structure. The wheel disc 24 is connected in a sliding manner to the output shaft 9 by using a bearing. The central gear 28 fixedly connected to the wheel disc 24 is in contact with the planet gear 26. The planet gear 26 and the planet gear 25 form an integrated structure and are connected in a sliding manner to the wheel axle 27 by using bearings. One end of the wheel axle 27 is fixedly connected to the stationary ring 29, and the other end of the wheel axle 27 is fixedly connected to the end cover c. The planet gear 25 is in contact with the output gear 30. The output gear 30 is fixedly connected to the output shaft 9. In an axial direction, divided by the output gear 30, a long end of the output shaft 9 is connected in a sliding manner to the wheel disc 24 by using a bearing and then connected in a sliding manner to the inner hole of the transmission shaft 8; and the other end of the output shaft 9 is fixedly connected to the cylinder bottom 20 of the rotor 22, then connected in a sliding manner to the end cover a by using a bearing, and then fixedly connected to the fan 11. The driving wheel 10 is pulled. The driving gear 15 fixedly connected to the transmission shaft 8 drives the gear II 16. The gear III 17 rotates synchronously with the gear II 16 and is in contact with the annular gear 19 to drive the annular gear 19 to rotate around the driving gear 15, and the round wheel 18 rotates together. The round wheel 18 propels the roller 22 to drive the wheel disc 24 to rotate together. The central gear 28 rotates synchronously with the wheel disc 24 to drive the planet gear 26. The planet gear 25 rotates synchronously with the planet gear 26 to drive the output gear 30. The output gear 30 is fixedly connected to the output shaft 9 and drives the rotor of the generator to rotate.

Figure 4:
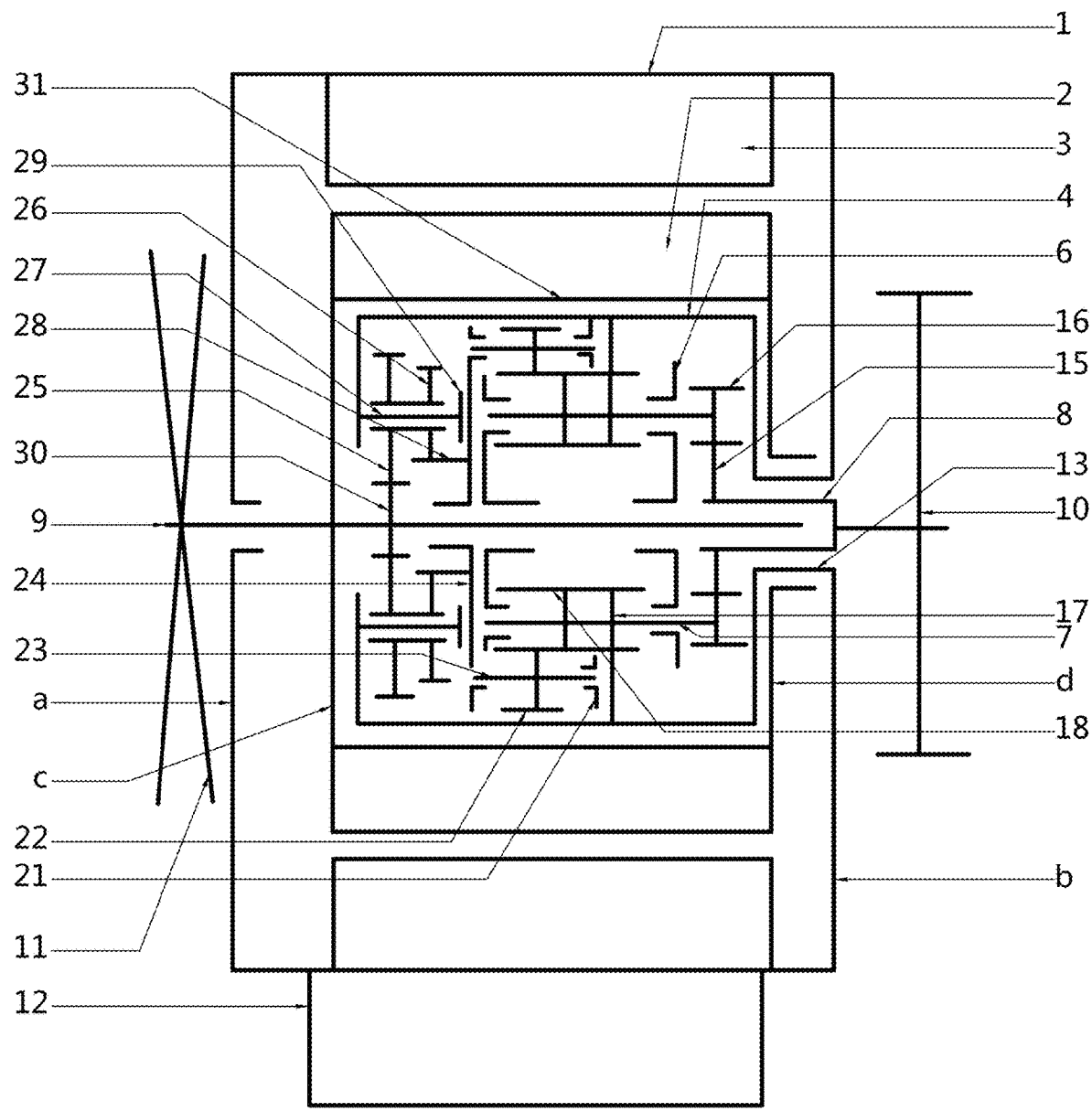
FIG. 4 is a schematic structural diagram of a generator combined with an adjustable-speed variable-torque device.

FIG. 4 is a schematic structural diagram of a generator combined with an adjustable-speed variable-torque device. As shown in FIG. 4, in a generator aspect, a generator includes a stator 3, a rotor 2 of a common permanent magnet structure, and an adjustable-speed variable-torque device. The stator 3 is fixed on a shell 1. The rotor 2 is fixed on the adjustable-speed variable-torque device. An end cover a and an end cover b are fixed at two ends of the shell 1 of the generator. A bottom of the shell 1 is fixedly connected to a base 12. A transmission shaft 8 and an output shaft 9 are connected in a sliding manner to the end cover a and the end cover b by using bearings. The rotor 2 is fixedly connected to the output shaft 9. In a radial direction, the rotor 2 externally corresponds to the stator 3. In an axial direction, divided by the rotor 2, one end of the output shaft 9 is connected in a sliding manner to the end cover a by using a bearing and then fixedly connected to a fan 11, and the other end of the output shaft 9 is fixedly connected to an output gear 30 and then connected in a sliding manner to an inner hole of the transmission shaft 8. The transmission shaft 8 is internally connected in a sliding manner to the output shaft 9, externally fixedly connected to a driving gear 15, then connected in a sliding manner to the end cover b by using a bearing, and then fixedly connected to a driving wheel 10. The rotor 2 has a common permanent magnet structure. The rotor 2 is cylinder-shaped. A permeable frame of the rotor 2 is cylinder-shaped and fixed on a housing 31 of the adjustable-speed variable-torque device and locked by an end cover c and an end cover d. The permeable frame is made of a permeable material sheet, for example, a ferrosilicon sheet. Holes are distributed on the permeable frame evenly and symmetrically, and permanent magnets are disposed in the holes so that four magnetic poles are formed on the rotor. A permanent magnet between two adjacent magnetic poles is for common use, a magnetic bridge is formed between the holes in which the permanent magnets are disposed, and space occupied by the magnetic bridge is mostly occupied by the permanent magnets. The adjustable-speed variable-torque device is formed by combining the housing 31, the end cover c, the end cover d, the transmission shaft 8, the driving gear 15, a gear II 16, a gear III 17, a round wheel 18, a wheel axle 7, cylindrical pins, a turning disc 5, a turning disc 6, an annular gear 19, a wheel carrier 4, a wheel ring 21, a wheel axle 23, cylindrical pins, a roller 22, a wheel disc 24, a central gear 28, a planet gear 26, a planet gear 25, a wheel axle 27, a stationary ring 29, the output gear 30, a stationary pipe 13, the output shaft 9, bearings, and the driving wheel 10. The end cover c and the end cover d are fixed at two ends of the housing 31. The end cover d is connected in a sliding manner to the stationary pipe 13 by using a bearing. The end cover c is fixedly connected to the output shaft 9. The transmission shaft 8 is internally connected in a sliding manner to the output shaft 9. The transmission shaft 8 is externally fixedly connected to the driving gear 15. The driving gear 15 is in contact with the gear II 16. The gear II 16, the gear III 17, and the round wheel 18 form an integrated structure and are fixedly connected to the wheel axle 7 jointly. The gear III 17 is in contact with the annular gear 19. The annular gear 19 is fixedly connected to the wheel carrier 4. The wheel carrier 4 is cylinder-shaped, a cylinder top is fixedly connected to a circular ring, the circular ring is fixedly connected to the wheel axle 27, a cylinder wall is fixedly connected to the annular gear 19, and a cylinder bottom is a circular disc and is fixedly connected to the stationary pipe 13. The stationary pipe 13 is fixedly connected to the end cover b. The stationary pipe 13 is internally connected in a sliding manner to the transmission shaft 8 by using a bearing. The wheel axle 7 is connected in a sliding manner to the turning disc 5 and the turning disc 6 by using bearings. There are four cylindrical pins between the turning disc 5 and the turning disc 6 for supporting and fixedly connecting the turning discs to form an integrated structure. The turning disc 5 and the turning disc 6 are connected in a sliding manner to the output shaft 9 by using bearings. The round wheel 18 is connected in a sliding manner to the roller 22. The roller 22 is fixedly connected to the wheel axle 23. The wheel axle 23 is connected in a sliding manner to the wheel disc 24 and the wheel ring 21 by using bearings. There are four cylindrical pins between the wheel disc 24 and the wheel ring 21 for supporting and fixedly connecting the wheel disc 24 and the wheel ring 21 to form an integrated structure. The wheel disc 24 is connected in a sliding manner to the output shaft 9 by using a bearing. The central gear 28 fixedly connected to the wheel disc 24 is in contact with the planet gear 26. The planet gear 26 and the planet gear 25 form an integrated structure and are connected in a sliding manner to the wheel axle 27 by using bearings. One end of the wheel axle 27 is fixedly connected to the stationary ring 29, and the other end of the wheel axle 27 is fixedly connected to the circular ring at the cylinder top of the wheel carrier 4. The planet gear 25 is in contact with the output gear 30. The output gear 30 and the end cover c are fixedly connected to the output shaft 9. The output shaft 9 is connected in a sliding manner to the end cover a by using a bearing and then fixedly connected to the fan 11. The driving wheel 10 is pulled. The driving gear 15 fixedly connected to the transmission shaft 8 drives the gear II 16. The gear III 17 rotates synchronously with the gear II 16 and is in contact with the annular gear 19 to drive the annular gear 19 to rotate around the driving gear 15, and the round wheel 18 rotates together. The round wheel 18 propels the roller 22 to drive the wheel disc 24 to rotate together. The central gear 28 rotates synchronously with the wheel disc 24 to drive the planet gear 26. The planet gear 25 rotates synchronously with the planet gear 26 to drive the output gear 30. The output gear 30 is fixedly connected to the output shaft 9 and drives the rotor of the generator to rotate.

Figure 5:
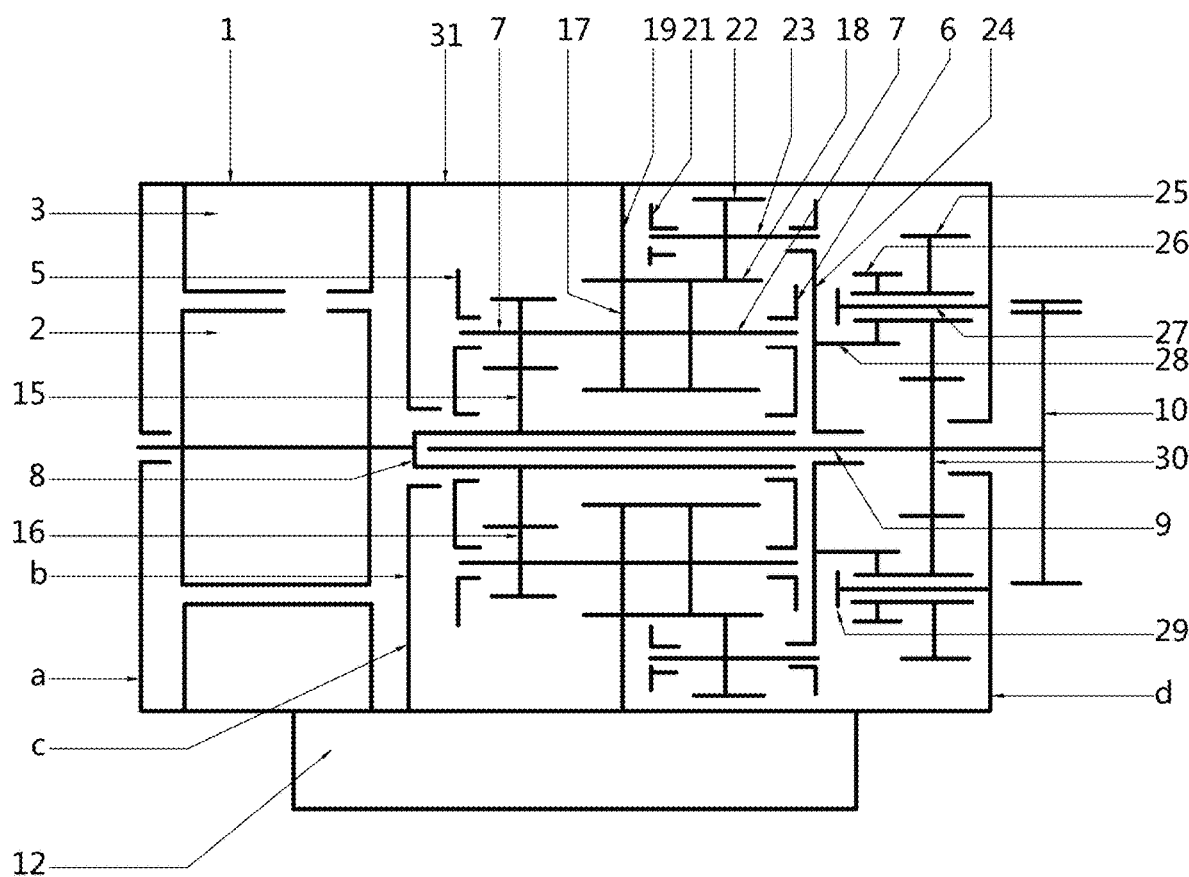
FIG. 5 is a schematic structural diagram of an electromotor combined with an adjustable-speed variable-torque device.

FIG. 5 is a schematic structural diagram of an electromotor combined with an adjustable-speed variable-torque device. As shown in FIG. 5, in an electromotor aspect, an adjustable-speed variable-torque device is disposed at one end of an electromotor, and the electromotor includes a stator 3 and a rotor 2 of a common permanent magnet structure. An end cover a and an end cover b are fixed at two ends of a shell 1 of the electromotor. A bottom of the shell 1 is fixedly connected to a base 12. A transmission shaft 8 and an output shaft 9 are connected in a sliding manner to the end cover a and the end cover b by using bearings. The rotor 2 is fixedly connected to the transmission shaft 8. In a radial direction, the rotor 2 externally corresponds to the stator 3. In an axial direction, one end of the transmission shaft 8 to which the rotor 2 is fixedly connected, is connected in a sliding manner to the end cover a by using a bearing; and the other end of the transmission shaft 8 is long and has a hole, the output shaft 9 is connected in a sliding manner to the hole, and the other end is externally connected in a sliding manner to the end cover b by using a bearing and then fixedly connected to a driving gear 15 in the adjustable-speed variable-torque device outside the electromotor. The rotor 2 has a common permanent magnet structure. The rotor 2 is cylinder-shaped. A permeable frame of the rotor 2 is cylinder-shaped and fixed on the transmission shaft 8. The permeable frame is made of a permeable material sheet, for example, a ferrosilicon sheet. Holes are distributed on the permeable frame evenly and symmetrically, and permanent magnets are disposed in the holes so that four magnetic poles are formed on the rotor. A permanent magnet between two adjacent magnetic poles is for common use, a magnetic bridge is formed between the holes in which the permanent magnets are disposed, and space occupied by the magnetic bridge is mostly occupied by the permanent magnets. The adjustable-speed variable-torque device is formed by combining a housing 31, an end cover c, an end cover d, the transmission shaft 8, the driving gear 15, a gear II 16, a gear III 17, a round wheel 18, a wheel axle 7, cylindrical pins, a turning disc 5, a turning disc 6, an annular gear 19, a roller 22, a wheel axle 23, cylindrical pins, a wheel ring 21, a wheel disc 24, a central gear 28, a planet gear 26, a planet gear 25, a wheel axle 27, a stationary ring 29, an output gear 30, the output shaft 9, bearings, and a driving wheel 10. The end cover c and the end cover d are fixed at two ends of the housing 31. The end cover c and the end cover b of the electromotor form an integrated structure. In the housing 31, the driving gear 15 is fixedly connected to the transmission shaft 8. The driving gear 15 is in contact with the gear II 16. The gear II 16, the gear III 17, and the round wheel 18 form an integrated structure and are fixedly connected to the wheel axle 7 jointly. The gear III 17 is in contact with the annular gear 19. The annular gear 19 is fixedly connected to the housing 31. The wheel axle 7 is connected in a sliding manner to the turning disc 5 and the turning disc 6 by using bearings. There are four cylindrical pins between the turning disc 5 and the turning disc 6 for supporting and fixedly connecting the turning discs to form an integrated structure. The turning disc 5 and the turning disc 6 are connected in a sliding manner to the transmission shaft 8 by using bearings. The round wheel 18 is connected in a sliding manner to the roller 22. The roller 22 is fixedly connected to the wheel axle 23. The wheel axle 23 is connected in a sliding manner to the wheel disc 24 and the wheel ring 21 by using bearings. There are four cylindrical pins between the wheel disc 24 and the wheel ring 21 for supporting and fixedly connecting the wheel disc 24 and the wheel ring 21 to form an integrated structure. The wheel disc 24 is connected in a sliding manner to the output shaft 9 by using a bearing. The central gear 28 fixedly connected to the wheel disc 24 is in contact with the planet gear 26. The planet gear 26 and the planet gear 25 form an integrated structure and are connected in a sliding manner to the wheel axle 27 by using bearings. One end of the wheel axle 27 is fixedly connected to the stationary ring 29, and the other end of the wheel axle 27 is fixedly connected to the end cover b of the electromotor. The planet gear 25 is in contact with the output gear 30. The output gear 30 is fixedly connected to the output shaft 9. In an axial direction, divided by the output gear 30, a long end of the output shaft 9 is connected in a sliding manner to the inner hole of the transmission shaft 8, and the other end of the output shaft 9 is connected in a sliding manner to the end cover b by using a bearing and then fixedly connected to the driving wheel 10. The rotor in the electromotor rotates. The driving gear 15 fixedly connected to the transmission shaft 8 drives the gear II 16. The gear III 17 rotates synchronously with the gear II 16 and is in contact with the annular gear 19 to drive the annular gear 19 to rotate around the driving gear 15, and the round wheel 18 rotates together. The round wheel 18 propels the roller 22 to drive the wheel disc 24 to rotate together. The central gear 28 rotates synchronously with the wheel disc 24 to drive the planet gear 26. The planet gear 25 rotates synchronously with the planet gear 26 to drive the output gear 30. The output gear 30 is fixedly connected to the output shaft 9 and drives the driving wheel 10 to rotate.

Figure 6:
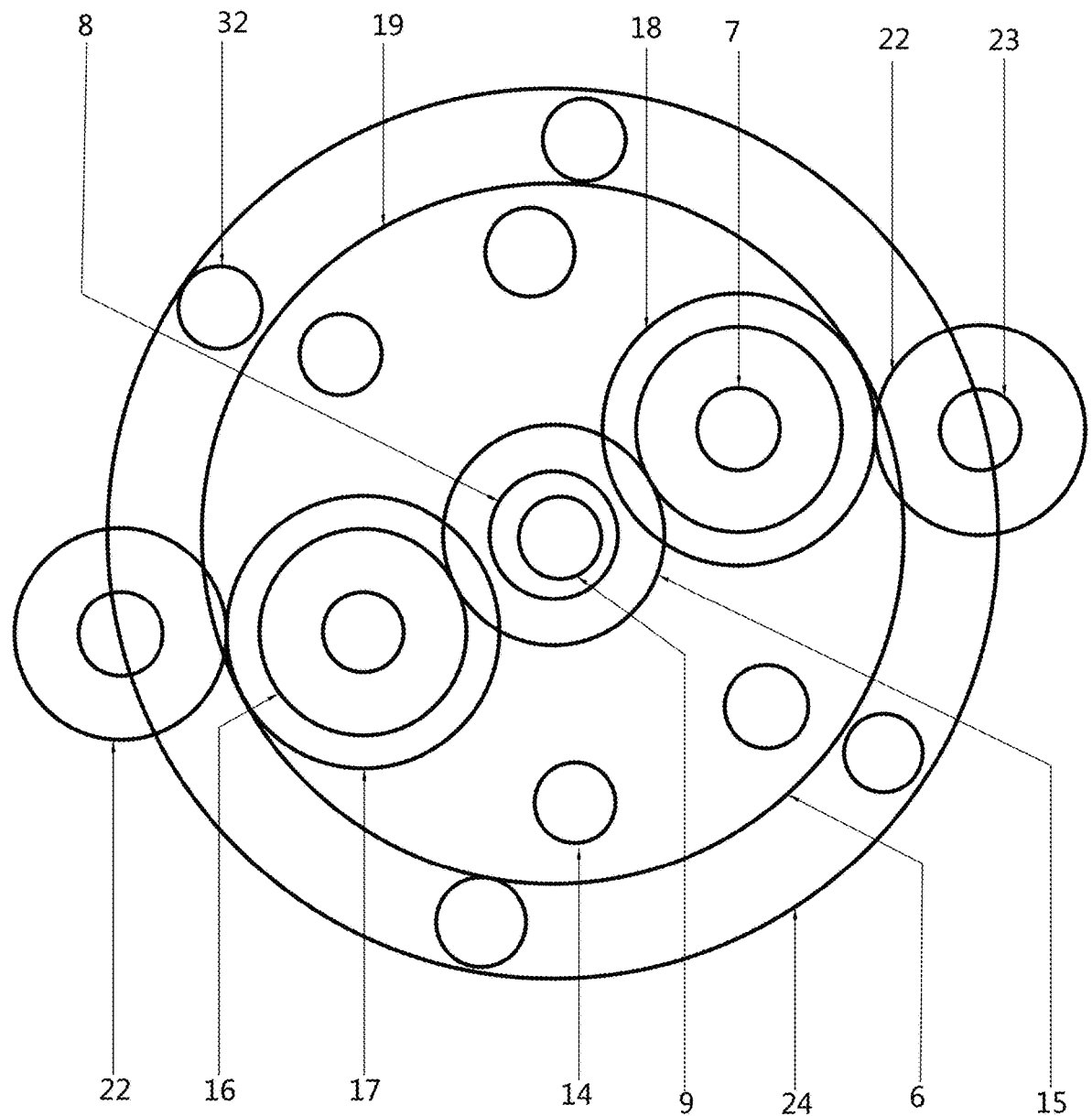
FIG. 6 is a schematic diagram of a transmission relationship between gears in an adjustable-speed variable-torque device.

FIG. 6 is a schematic diagram of a transmission relationship between gears in an adjustable-speed variable-torque device, and is also a schematic diagram of a transmission relationship between gears in the adjustable-speed variable-torque device in FIG. 1, FIG. 2, FIG. 3, FIG. 4, or FIG. 5. As shown in FIG. 6, the adjustable-speed variable-torque device includes a turning disc 6, cylindrical pins 14, a driving gear 15, gears II 16, gears III 17, round wheels 18, wheel axles 7, an annular gear 19, a wheel disc 24, cylindrical pins 32, rollers 22, a wheel axle 23, a transmission shaft 8, and an output shaft 9. There are four cylindrical pins 14 for supporting between a turning disc 5 (not shown in the figure) and the turning disc 6. Two sets of transmission gears are mounted. Each set of transmission gears includes a gear II 16, a gear III 17, and a round wheel 18. The gear II 16, the gear III 17, and the round wheel 18 are fixedly connected to a same wheel axle 7, and bearings are mounted at two ends of the wheel axle 7 for connecting to the turning disc 5 and the turning disc 6 in a sliding manner. There are four cylindrical pins 32 for supporting between a wheel ring 21 (not shown in the figure) and the wheel disc 24. Two rollers 22 are mounted, and the rollers 22 are fixedly connected to the wheel axle 23. Bearings are mounted at two ends of the wheel axle 23 for connecting to the wheel ring 21 (not shown in the figure) and the wheel disc 24 in a sliding manner. The driving gear 15 is fixedly connected to the transmission shaft 8. When the transmission shaft 8 rotates, the driving gear 15 rotates together with the transmission shaft 8. The driving gear 15 is in contact with the gears II 16 in the two sets of transmission gears. When the gear II 16 rotates, the gear III 17 rotates synchronously with the gear II 16 and is in contact with the annular gear 19 to drive the annular gear 19 to rotate around the driving gear 15. The round wheel 18 is integrated with the gear III 17. The round wheel 18 rotates together with the gear III 17. The round wheel 18 and the gear III 17 are fixedly connected to the wheel axle 7 and connected in a sliding manner to the turning disc 5 and the turning disc 6. The turning disc 5 and the turning disc 6 rotate together. The round wheel 18 propels the roller 22. The roller 22 is fixedly connected to the wheel axle 23 and connected in a sliding manner to the wheel disc 24. The roller 22 drives the wheel disc 24 to rotate with the turning disc 5 and the turning disc 6 at a same speed. In this way, a speed at which the gear III 17 and the round wheel 18 complete one revolution around the driving gear 15 is less than a speed at which the driving gear 15 completes one revolution, and a speed at which the wheel disc 24 completes one revolution is also less than the speed at which the driving gear 15 completes one revolution. However, torque of the driving gear 15 is less than torque of the wheel disc 24, and the torque of the wheel disc 24 is x times (x is a positive integer) that of the driving gear 15. Therefore, the adjustable-speed variable-torque device is capable of increasing torque and resisting overload.

Figure 7:
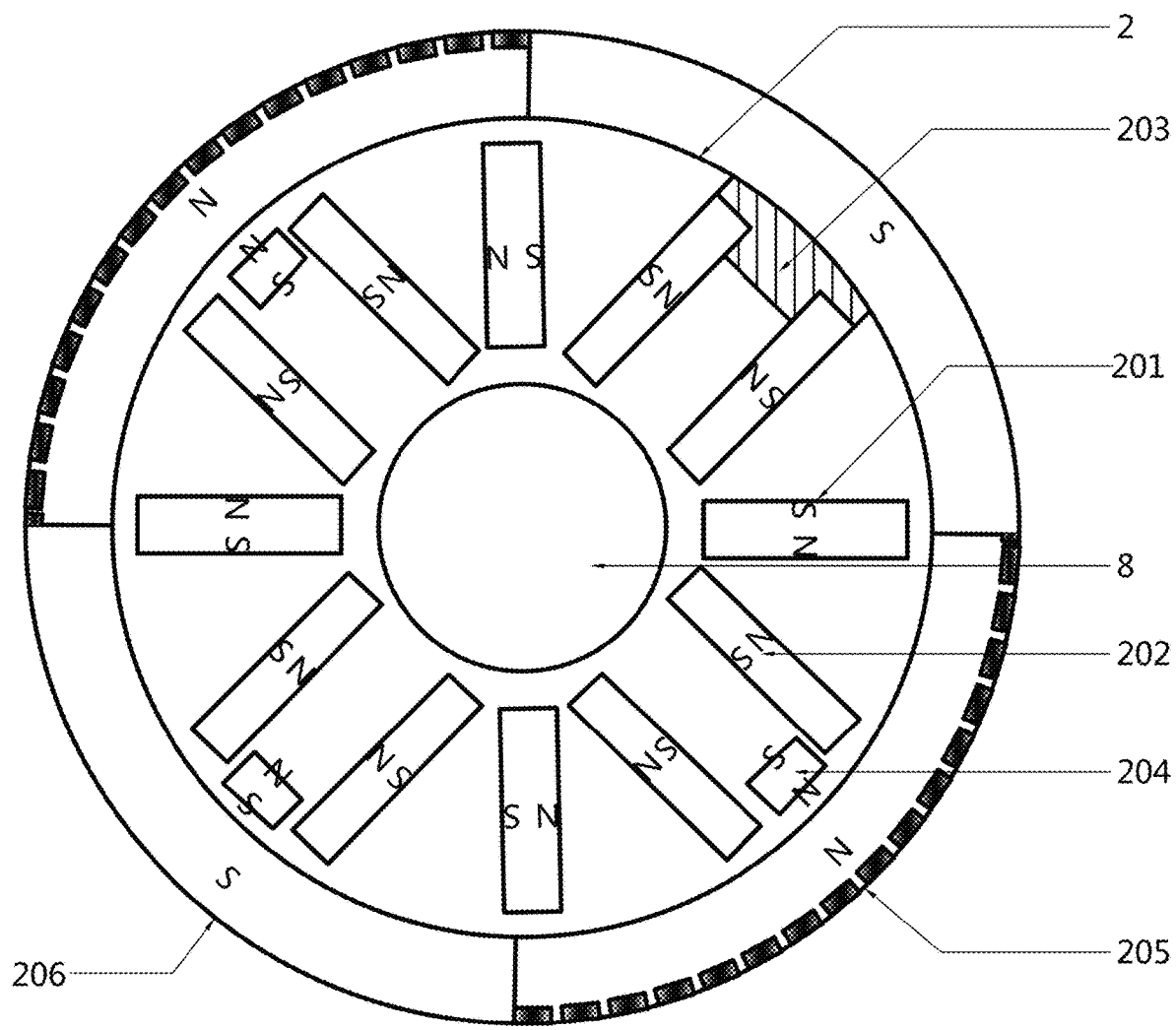
FIG. 7 is a schematic diagram of a common permanent magnet structure on a rotor.

FIG. 7 is a schematic diagram of a common permanent magnet structure on a rotor, where the rotor is also the rotor 2 of the motor in FIG. 5. The rotor 2 is cylinder-shaped. Although the rotors 2 in FIG. 1, FIG. 2, FIG. 3, and FIG. 4 are ring-shaped, materials of the permeable frames of the rotors 2 and structures of the permeable frames are the same. As shown in FIG. 7, the rotor 2 is cylinder-shaped and fixed on a transmission shaft 8. The permeable frame is made of a permeable material sheet, for example, a ferrosilicon sheet. Holes are distributed on the permeable frame evenly and symmetrically. A permanent magnet 201, a permanent magnet 202, and a permanent magnet 204 are disposed in the holes to form two N magnetic poles 205 and two S magnetic poles 206 on the rotor 2. The permanent magnet 201 between two adjacent magnetic poles is for common use. A magnetic bridge 203 is formed between the holes in which the permanent magnets are disposed, and space occupied by the magnetic bridge 203 is mostly occupied by the permanent magnets 204. In this way, internal space of the rotor is maximally used. With the common structure of the permanent magnet 201, the rotor has higher magnetic field strength at magnetic poles than a rotor of a same volume, and therefore, a working capability of the motor is improved.

Figure 8:
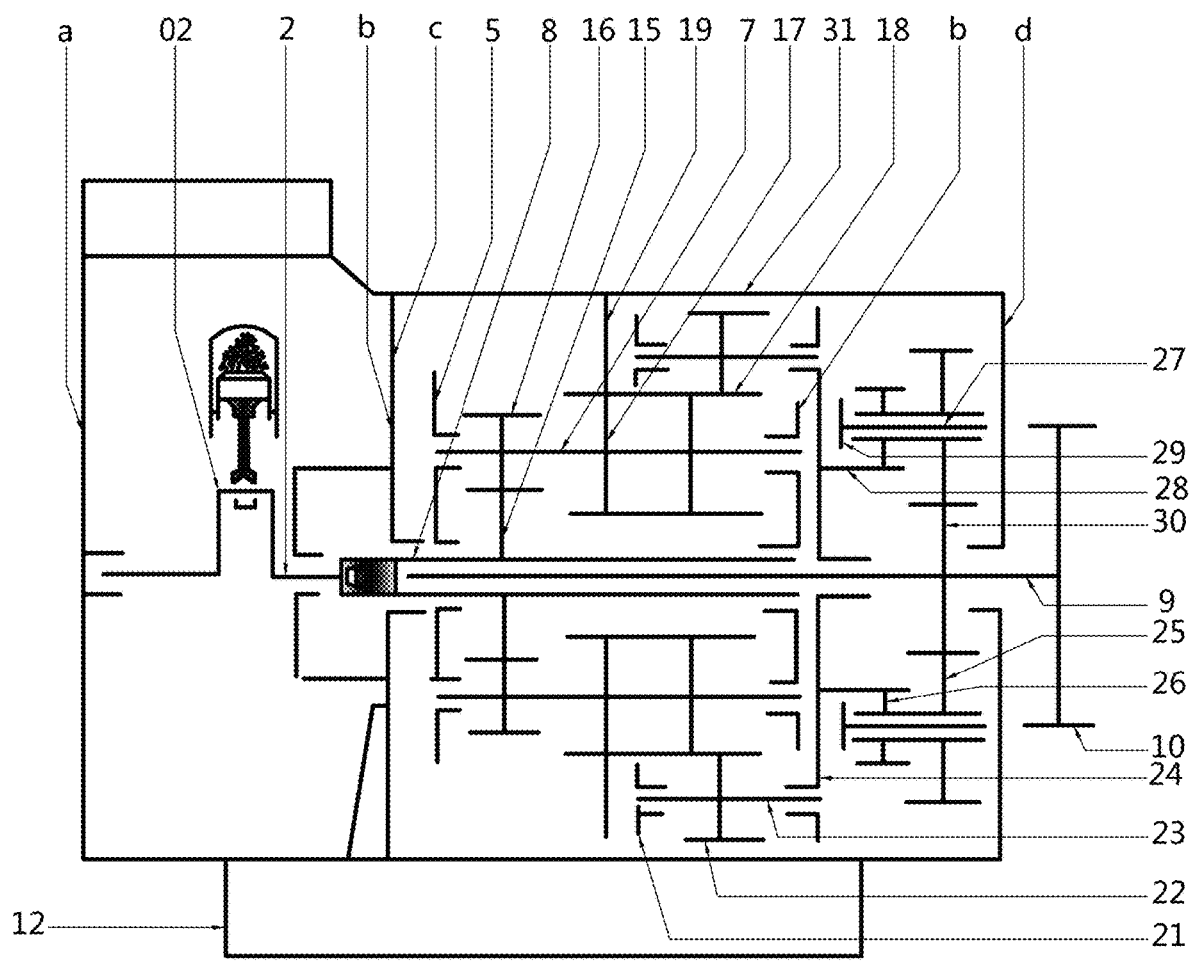
FIG. 8 is a schematic structural diagram of an engine combined with an adjustable-speed variable-torque device.

FIG. 8 is a schematic structural diagram of an engine combined with an adjustable-speed variable-torque device. An electromotor is also an engine. In FIG. 8, the electromotor in FIG. 5 is replaced with a fuel engine, and its actual significance is to indicate that the adjustable-speed variable-torque device may be used in combination with many power systems, for example, a water power set, a thermal power unit, a nuclear power unit, and a wind power unit. Details are not further described. Herein, FIG. 8 is used merely as an example for description. As shown in FIG. 8, an adjustable-speed variable-torque device is used in combination with a fuel engine. A bottom is fixedly connected to a base 12. The fuel engine includes an end cover a, an end cover b, a crank 02, and a moving shaft 2. The moving shaft 2 and the crank 02 form an integrated structure. The moving shaft 2 is connected in a sliding manner to the end cover a and the end cover b by using bearings. The moving shaft 2 is fixedly connected to a transmission shaft 8 of the adjustable-speed variable-torque device. A driving gear 15 is fixedly connected to the transmission shaft 8. The adjustable-speed variable-torque device is formed by combining a housing 31, an end cover c, an end cover d, the transmission shaft 8, the driving gear 15, a gear II 16, a gear III 17, a round wheel 18, a wheel axle 7, cylindrical pins, a turning disc 5, a turning disc 6, an annular gear 19, a roller 22, a wheel axle 23, cylindrical pins, a wheel ring 21, a wheel disc 24, a central gear 28, a planet gear 26, a planet gear 25, a wheel axle 27, a stationary ring 29, an output gear 30, an output shaft 9, bearings, and a driving wheel 10. The end cover c and the end cover d are fixed at two ends of the housing 31. The end cover c and the end cover b of the fuel engine form an integrated structure. In the housing 31, the driving gear 15 is fixedly connected to the transmission shaft 8. The driving gear 15 is in contact with the gear II 16. The gear II 16, the gear III 17, and the round wheel 18 form an integrated structure and are fixedly connected to the wheel axle 7 jointly. The gear III 17 is in contact with the annular gear 19. The annular gear 19 is fixedly connected to the housing 31. The wheel axle 7 is connected in a sliding manner to the turning disc 5 and the turning disc 6 by using bearings. There are four cylindrical pins between the turning disc 5 and the turning disc 6 for supporting and fixedly connecting the turning discs to form an integrated structure. The turning disc 5 and the turning disc 6 are connected in a sliding manner to the transmission shaft 8 by using bearings. The round wheel 18 is connected in a sliding manner to the roller 22. The roller 22 is fixedly connected to the wheel axle 23. The wheel axle 23 is connected in a sliding manner to the wheel disc 24 and the wheel ring 21 by using bearings. There are four cylindrical pins between the wheel disc 24 and the wheel ring 21 for supporting and fixedly connecting the wheel disc 24 and the wheel ring 21 to form an integrated structure. The wheel disc 24 is connected in a sliding manner to the output shaft 9 by using a bearing. The central gear 28 fixedly connected to the wheel disc 24 is in contact with the planet gear 26. The planet gear 26 and the planet gear 25 form an integrated structure and are connected in a sliding manner to the wheel axle 27 by using bearings. One end of the wheel axle 27 is fixedly connected to the stationary ring 29, and the other end of the wheel axle 27 is fixedly connected to the end cover b of the fuel engine. The planet gear 25 is in contact with the output gear 30. The output gear 30 is fixedly connected to the output shaft 9. In an axial direction, divided by the output gear 30, a long end of the output shaft 9 is connected in a sliding manner to an inner hole of the transmission shaft 8, and the other end of the output shaft 9 is connected in a sliding manner to the end cover b by using a bearing and then fixedly connected to the driving wheel 10. The crank 02 and the moving shaft 2 in the fuel engine rotate. The driving gear 15 fixedly connected to the transmission shaft 8 drives the gear II 16. The gear III 17 rotates synchronously with the gear II 16 and is in contact with the annular gear 19 to drive the annular gear 19 to rotate around the driving gear 15, and the round wheel 18 rotates together. The round wheel 18 propels the roller 22 to drive the wheel disc 24 to rotate together. The central gear 28 rotates synchronously with the wheel disc 24 to drive the planet gear 26. The planet gear 25 rotates synchronously with the planet gear 26 to drive the output gear 30. The output gear 30 is fixedly connected to the output shaft 9 and drives the driving wheel 10 to rotate.

Figure 9:
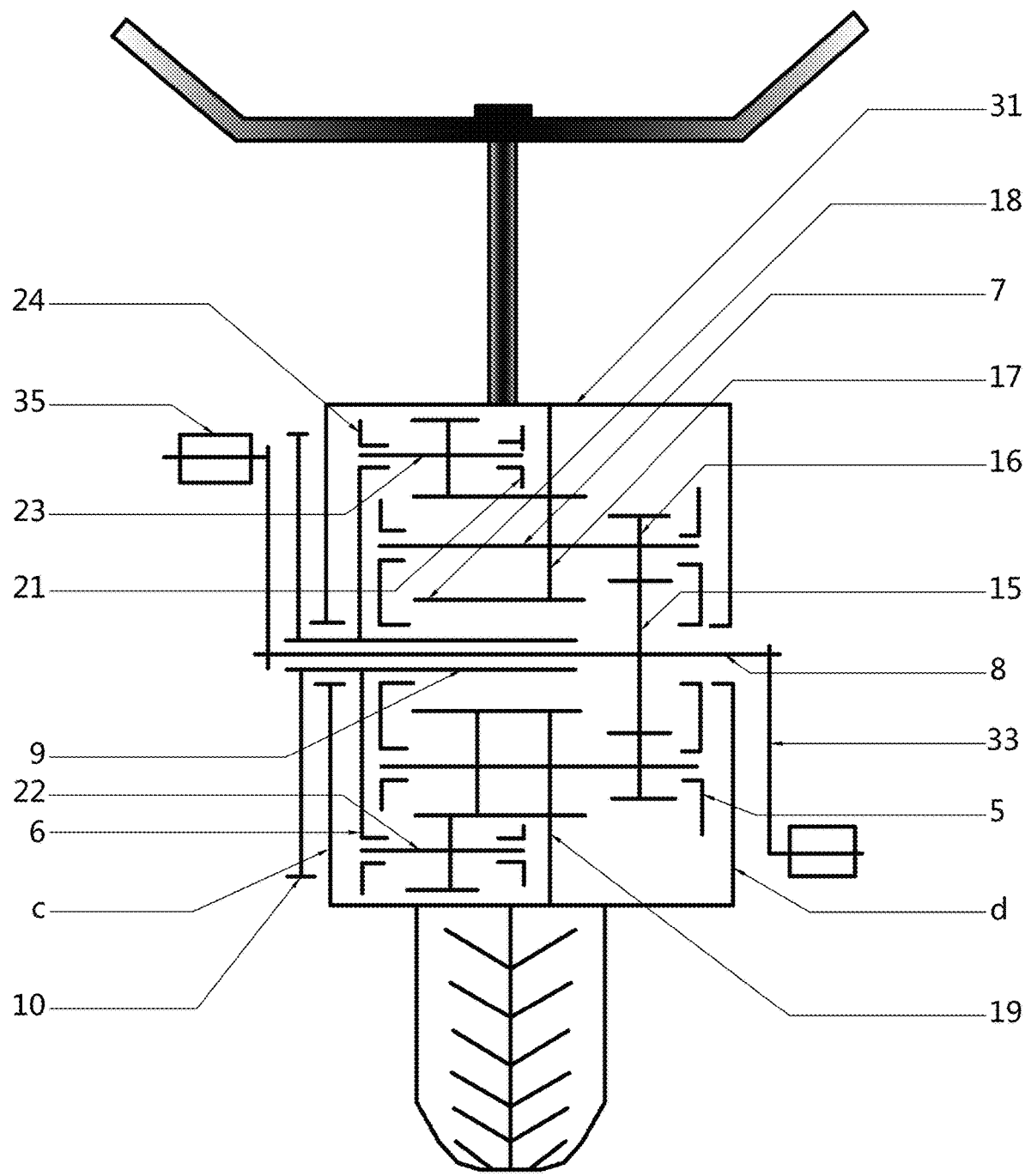
FIG. 9 is a schematic structural diagram of a human-powered vehicle combined with an adjustable-speed variable-torque device.

FIG. 9 is a schematic structural diagram of a human-powered vehicle combined with an adjustable-speed variable-torque device. In the foregoing example in FIG. 8, the electromotor in FIG. 5 is replaced with an engine. In the example in FIG. 9, the electromotor in FIG. 5 is replaced with a human power transmission mechanism. This also indicates that the adjustable-speed variable-torque device may be used in combination with many power systems, and used in combination with moving tools, for example, used in combination with power systems of moving tools such as a vehicle, a train, a ship, and an aircraft. Details are not further described. Herein, FIG. 9 is used merely as an example for description. As shown in FIG. 9, for a human-powered bicycle, power comes from a pedal driving mechanism. Pedals 35 are connected to a rod 33. The rod 33 is connected to a transmission shaft 8 of the adjustable-speed variable-torque device. A driving gear 15 is fixedly connected to the transmission shaft 8. The adjustable-speed variable-torque device is formed by combining a housing 31, an end cover c, an end cover d, the transmission shaft 8, the driving gear 15, a gear II 16, a gear III 17, a round wheel 18, a wheel axle 7, cylindrical pins, a turning disc 5, a turning disc 6, an annular gear 19, a roller 22, a wheel axle 23, cylindrical pins, a wheel ring 21, a wheel disc 24, a central gear 28, a planet gear 26, a planet gear 25, a wheel axle 27, a stationary ring 29, an output gear 30, an output shaft 9, bearings, and a driving wheel 10. The housing 31 is fixedly connected to a body of the bicycle. The end cover c and the end cover d are fixed at two ends of the housing 31. In the housing 31, the driving gear 15 is fixedly connected to the transmission shaft 8. The driving gear 15 is in contact with the gear II 16. The gear II 16, the gear III 17, and the round wheel 18 form an integrated structure and are fixedly connected to the wheel axle 7 jointly. The gear III 17 is in contact with the annular gear 19. The annular gear 19 is fixedly connected to the housing 31. The wheel axle 7 is connected in a sliding manner to the turning disc 5 and the turning disc 6 by using bearings. There are four cylindrical pins between the turning disc 5 and the turning disc 6 for supporting and fixedly connecting the turning discs to form an integrated structure. The turning disc 5 is connected in a sliding manner to the transmission shaft 8 by using a bearing. The turning disc 6 is connected in a sliding manner to the output shaft 9 by using a bearing. The round wheel 18 is connected in a sliding manner to the roller 22. The roller 22 is fixedly connected to the wheel axle 23. The wheel axle 23 is connected in a sliding manner to the wheel disc 24 and the wheel ring 21 by using bearings. There are four cylindrical pins between the wheel disc 24 and the wheel ring 21 for supporting and fixedly connecting the wheel disc 24 and the wheel ring 21 to form an integrated structure. The wheel disc 24 is fixedly connected to the output shaft 9. The output shaft 9 is pipe-shaped, and an inner hole of the output shaft 9 is connected in a sliding manner to the transmission shaft 8. The output shaft 9 is fixedly connected to the wheel disc 24 and then connected in a sliding manner to the end cover c by using a bearing. The driving wheel 10 is fixedly connected to the output shaft 9. The driving wheel 10 drives wheels (not shown in the figure) of the bicycle by using a chain. Human power drives the pedals 35 to rotate and further drives the rod 33 and the transmission shaft 8 to rotate. The driving gear 15 fixedly connected to the transmission shaft 8 drives the gear II 16. The gear III 17 rotates synchronously with the gear II 16 and is in contact with the annular gear 19 to drive the annular gear 19 to rotate around the driving gear 15, and the round wheel 18 rotates together. The round wheel 18 propels the roller 22 to drive the wheel disc 24 to rotate together. The output shaft 9 rotates together with the wheel disc 24 and drives the driving wheel 10 to rotate. The driving wheel 10 drives the wheels of the bicycle by using the chain.

The present invention is described above with reference to the accompanying drawings. However, the present invention is not limited to the examples. Any modification, addition, deletion, replacement, or displacement with respect to the present invention shall fall within the scope of the present invention.

What is claimed is:

1. A motor, comprising an end cover a, an end cover b, and a transmission shaft, wherein the transmission shaft is connected in a sliding manner to the end cover a and the end cover b respectively by using a first bearing and a second bearing, a rotor of a common permanent magnet structure is fixedly connected to the transmission shaft, the rotor has a permeable frame, the permeable frame is in a circular shape on the whole, holes are distributed on the permeable frame evenly and symmetrically, permanent magnets are disposed in the holes so that at least two magnetic poles are formed on the rotor, a permanent magnet between two adjacent magnetic poles is for common use, a magnetic bridge is formed between the holes in which the permanent magnets are disposed; and further comprising an adjustable-speed variable-torque device, wherein an input portion of the adjustable-speed variable-torque device is set to deceleration, a portion thereafter is set to torque increase and acceleration, and the adjustable-speed variable-torque device comprises a housing, an end cover c, an end cover d, a driving gear, a gear II, a gear III, a round wheel, a first wheel axle, a second wheel axle, a third wheel axle, first cylindrical pins, second cylindrical pins, turning discs, an annular gear, a roller, a wheel ring, a wheel disc, a central gear, one first planet gear, one second planet gear, a stationary ring, an output gear, an output shaft, a third bearing, a forth bearing, a fifth bearing, a sixth bearing, a seventh bearing, an eighth bearing, a ninth bearing, a tenth bearing, an eleventh bearing, a twelfth bearing, a thirteenth bearing, and a driving wheel, wherein the end cover c and the end cover d are fixedly disposed at two ends of the housing, one of the end cover c and the end cover d and one of the end covers of the motor form an integrated structure, the driving gear in the housing is fixedly disposed on the transmission shaft, the driving gear is in contact with at least one set of transmission gears, one set of transmission gears comprises a gear II and a gear III that are combined with a round wheel into an integrated structure and fixedly connected to the first wheel axle jointly, the driving gear is in contact with the gear II, the gear III is contact with the annular gear, the annular gear is fixedly connected to the housing, at least one round wheel is connected in a sliding manner to a roller, the first wheel axle is connected in a sliding manner to two turning discs respectively by using the third bearing and the forth bearing, there are at least two first cylindrical pins between the two turning discs for supporting and fixedly connecting the two turning discs to form an integrated structure, the two turning discs are connected in a sliding manner to the transmission shaft respectively by using the fifth bearing and the sixth bearing, at least one roller is fixedly connected to the second wheel axle, the second wheel axle is connected in a sliding manner to the wheel disc and the wheel ring respectively by using the seventh bearing and the eighth bearing, there are at least two second cylindrical pins between the wheel disc and the wheel ring for supporting and fixedly connecting the wheel disc and the wheel ring to form an integrated structure, the wheel disc is connected in a sliding manner to the output shaft by using the ninth bearing, the central gear fixedly connected to the wheel disc is in contact with the second planet gear, the first and second planet gears are combined into an integrated structure and connected in a sliding manner to the third wheel axle by using the tenth bearing, the first planet gear is in contact with the output gear, one end of the third wheel axle is fixedly connected to the stationary ring, the other end of the third wheel axle is fixedly connected to an end cover of the motor, the output gear is fixedly connected to the output shaft, one end of the output shaft is connected in a sliding manner to an inner hole of the transmission shaft, and the other end of the output shaft, after passing through an end cover, is fixedly connected to the driving wheel by using the eleventh bearing.

2. The motor according to claim 1, wherein the motor is an electromotor, the end cover a and the end cover b are located at two ends of a shell of the electromotor, the end cover d and the end cover b form an integrated structure, a stator, the rotor, and adjustable-speed variable-torque device are located in the electromotor, and the stator is fixed on adjustable-speed variable-torque device; the rotor is cylinder-shaped, a cylinder bottom is in a circular shape, the cylinder bottom is fixedly connected to the transmission shaft, a cylinder wall is fixedly connected to the cylinder bottom, and the cylinder wall has a permeable frame made of a permeable material sheet; the output shaft is connected in a sliding manner to the end cover a and the end cover b respectively by using the twelfth bearing and the thirteenth bearing, and the rotor is fixedly connected to the transmission shaft; in a radial direction, the rotor internally corresponds to the stator; and in an axial direction, one end of the transmission shaft is connected in a sliding manner to the end cover a by using the first bearing and then fixedly connected to a fan, there is a hole in the other end, the driving gear is fixedly connected to the other end, and the output shaft is connected in a sliding manner to the hole.

3. The motor according to claim 1, wherein the motor is an electromotor, a stator, the rotor, and the adjustable-speed variable-torque device are located in the electromotor, the stator is fixed on a shell of the electromotor, and the rotor is fixed on the adjustable-speed variable-torque device; the end cover a and the end cover b are fixed at two ends of the shell of the electromotor, the output shaft is connected in a sliding manner to the end cover a and the end cover b respectively by using the twelfth bearing and the thirteenth bearing, the rotor is fixedly connected to the transmission shaft, the rotor is integrated with the housing of the adjustable-speed variable-torque device, and the transmission shaft is fixedly connected to the end cover c and connected in a sliding manner to the output shaft; in a radial direction, the rotor externally corresponds to the stator; in an axial direction, one end of the output shaft, after passing through the end cover a, is fixedly connected to a fan by using the twelfth bearing, and the other end of the output shaft, after passing through the end cover b, is fixedly connected to the driving wheel by using the thirteenth bearing; the permeable frame in the rotor is cylinder-shaped and fixed on the housing of the adjustable-speed variable-torque device and locked by the end cover c and the end cover d; and the adjustable-speed variable-torque device further comprises a wheel carrier and a stationary pipe, the end cover d is connected in a sliding manner to the stationary pipe by using a fourteenth bearing, the transmission shaft is tubular, the transmission shaft is internally connected in a sliding manner to the output shaft by using a fifteenth bearing, the transmission shaft is externally fixedly connected to the driving gear, the wheel carrier is cylinder-shaped, a cylinder wall is fixedly connected to the annular gear, a cylinder bottom is a circular disc and is fixedly connected to the stationary pipe, the stationary pipe is fixedly connected to the end cover b, the stationary pipe is internally connected in a sliding manner to the output shaft by using a sixteenth bearing, one end of the third wheel axle is fixedly connected to the stationary ring, and the other end of the third wheel axle is fixedly connected to the circular disc at the cylinder bottom of the wheel carrier.

4. The motor according to claim 1, wherein the motor is an electromotor, the adjustable-speed variable-torque device is disposed at one end of the electromotor, and a stator and the rotor are disposed in the electromotor.

5. The motor according to claim 1, wherein the motor is a generator, the end cover a and the end cover b are located at two ends of a shell of the generator, the end cover d and the end cover b form an integrated structure, a stator, the rotor, and the adjustable-speed variable-torque device are located in the generator, and the stator is fixed on the adjustable-speed variable-torque device; the rotor is cylinder-shaped, a cylinder bottom is in a circular shape, the cylinder bottom is fixedly connected to the output shaft, a cylinder wall is fixedly connected to the cylinder bottom, and the cylinder wall has a permeable frame made of a permeable material sheet; the output shaft is connected in a sliding manner to the end cover a and the end cover b respectively by using the twelfth bearing and the thirteenth bearing, and the rotor is fixedly connected to the output shaft; in a radial direction, the rotor internally corresponds to the stator; and in an axial direction, one end of the output shaft is connected in a sliding manner to the end cover a by using the twelfth bearing and then fixedly connected to a fan, the other end of the output shaft is connected in a sliding manner to the inner hole of the transmission shaft, the driving gear is fixedly connected to the transmission shaft, and the transmission shaft is connected in a sliding manner to the two turning discs.

6. The motor according to claim 1, wherein the motor is a generator, a stator, the rotor, and the adjustable-speed variable-torque device are located in the generator, the stator is fixed on a shell of the generator, and the rotor is fixed on the adjustable-speed variable-torque device; the end cover a and the end cover b are fixed at two ends of the shell of the generator, the output shaft is connected in a sliding manner to the end cover a and the end cover b respectively by using the twelfth bearing and the thirteenth bearing, the rotor is fixedly connected to the output shaft, and the rotor is integrated with the adjustable-speed variable-torque device; in a radial direction, the rotor externally corresponds to the stator; and in an axial direction, one end of the output shaft is connected in a sliding manner to the end cover a by using the twelfth bearing and then fixedly connected to a fan, the other end of the output shaft is fixedly connected to the output gear and then connected in a sliding manner to the inner hole of the transmission shaft, and the transmission shaft is internally connected in a sliding manner to the output shaft, externally fixedly connected to the driving gear, connected in a sliding manner to the end cover b by using the second bearing, and then fixedly connected to the driving wheel.

7. The motor according to claim 1, wherein the adjustable-speed variable-torque device comprises the turning discs, the first cylindrical pins, the second cylindrical pins, the driving gear, gears II, gears III, round wheels, the first wheel axle, the second wheel axle, the third wheel axle, the annular gear, the wheel disc, rollers, the transmission shaft, and the output shaft; there are at least two first cylindrical pins between the two turning discs for supporting the turning discs, at least two sets of transmission gears are mounted, each set of transmission gears comprises a gear II, a gear III, and a round wheel, the gear II, the gear III, and the round wheel are fixedly connected to the first wheel axle, and the third and forth bearings are respectively mounted at two ends of the first wheel axle for connecting to the two turning discs in a sliding manner; there are at least two second cylindrical pins for supporting between the wheel ring and the wheel disc, at least two rollers are mounted, the rollers are fixedly connected to the second wheel axle, and the seventh and eighth bearings are respectively mounted at two ends of the second wheel axle for connecting to the wheel ring and wheel disc in a sliding manner; and the driving gear is fixedly connected to the transmission shaft, and the driving gear is in contact with the gears II in the at least two sets of transmission gears.

8. A power device, comprising an engine, wherein the adjustable-speed variable-torque device according to claim 1 is applied to the engine.

9. A human power transmission mechanism, comprising a bicycle, wherein the adjustable-speed variable-torque device according to claim 1 is applied to the bicycle.

* * * * *